United States Patent [19]
Wittenberg

[11] 4,113,267
[45] Sep. 12, 1978

[54] DOUBLE STYLUS ASSEMBLY FOR PHONOGRAPH RECORD STAMPER PLAYBACK

[75] Inventor: Roland C. Wittenberg, New Hyde Park, N.Y.

[73] Assignee: Pickering & Company, Inc., Plainview, N.Y.

[21] Appl. No.: 790,397

[22] Filed: Apr. 25, 1977

[51] Int. Cl.² .................... G11B 3/02; G11B 3/44
[52] U.S. Cl. .......................... 274/37; 274/38
[58] Field of Search ........................ 274/37, 38

[56] References Cited

U.S. PATENT DOCUMENTS

| 3,143,199 | 8/1964 | Gerber | 274/10 |
| 3,292,936 | 12/1966 | Grado | 274/38 |

FOREIGN PATENT DOCUMENTS

| 431,077 | 10/1911 | France | 274/38 |
| 359,899 | 3/1962 | Switzerland | 274/38 |

Primary Examiner—Charles E. Phillips
Assistant Examiner—John W. Shepperd
Attorney, Agent, or Firm—Kane, Dalsimer, Kane, Sullivan and Kurucz

[57] ABSTRACT

A playback stylus assembly for a phonograph record stamper and matrix is provided. The stylus assembly comprises a pair of conventional jeweled styli members each terminating at a tipped end. The styli are bonded to each other but offset from one another to form a "V" to ride along the stamper ridges. The ends of the styli opposite the tip ends are bonded to a tube.

3 Claims, 3 Drawing Figures

DOUBLE STYLUS ASSEMBLY FOR PHONOGRAPH RECORD STAMPER PLAYBACK

BACKGROUND OF THE INVENTION

The present invention relates to phonograph cartridge styli and more particularly to a stylus for playing back the matrix or stamper with which phonograph records are stamped.

The first step in the production of phonograph records comprises the cutting of a master. The master is then used to produce a metal matrix which is then used to produce a metal mother which is an exact duplicate of the original master. From the metal mothers, stampers are formed. The stampers and matrix are the negative or reverse of the master to the extent that grooves in the master become raised ridges in the stamper and vice-versa. The stamper is formed of a relatively hard metal and it in turn is then used with another stamper representing the other side of the record as a die into which vinyl material is introduced and squeezed under extremely high pressure to form the final phonograph record platter.

It can thus be seen that the resultant final record disc can only be as good as the stamper. Heretofore, means have been available to play back the master, mother and final record but not the stamper or matrix. It was necessary to produce records from a stamper and then play back the records in order to test the accuracy of the stamper, requiring as a result the expenditure of time and labor. If the produced record did not play back true, it was then necessary to determine whether the problem was in the stamper or record. Further, if the problem was in the stamper, as for example, a high spot or rough spot, it was difficult to pin-point the location of the problem area for correction.

In view of the above, it is the principal object of the present invention to provide an improved phonograph cartridge stylus specifically adapted to permit the playback of phonograph record stampers.

A further object is to provide such a stylus which may be utilized in a conventional phonograph cartridge.

A still further object is to provide such a stylus which, while playing the master can also serve to remove or polish down high or rough spots.

SUMMARY OF THE INVENTION

The above and other beneficial objects and advantages are attained in accordance with the present invention by providing a stylus assembly comprising a pair of conventional jeweled styli members each terminating at a tipped end. The styli are bonded to each other but offset from one another to form a "V" to ride along the stamper ridges. The ends of the styli opposite the tip ends are bonded to a tube.

DETAILED DESCRIPTION OF THE PREFERRED EMBODIMENT

Figure 1:
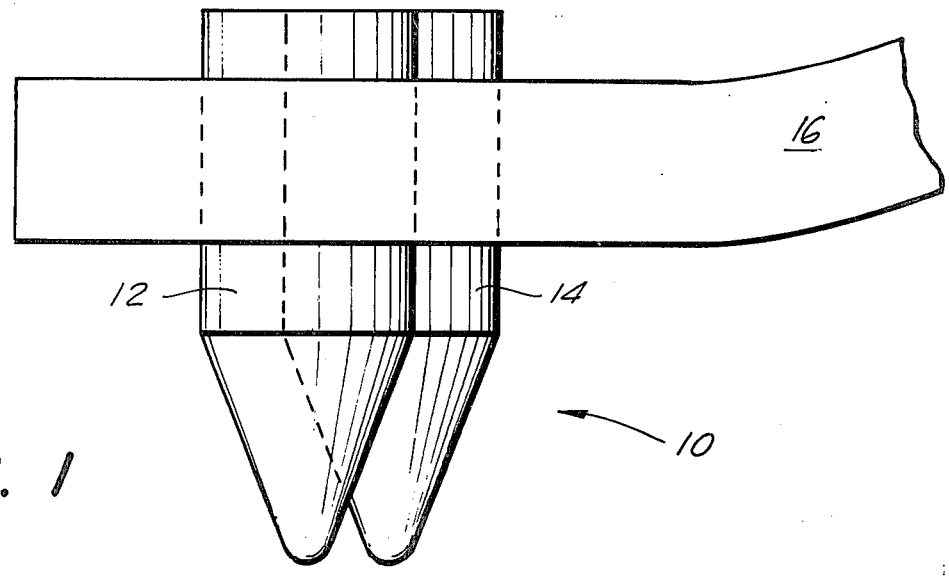
FIG. 1 is a greatly enlarged perspective view of a stylus assembly in accordance with the present invention.

Reference is now made to the drawings and to FIG. 1 in particular wherein the stylus assembly 10 in accordance with the present invention is shown. Stylus assembly 10 comprises a pair of conventional styli 12 and 14 fixed at one end to a tube 16. Styli 12 and 14 are of conventional phonograph record cartridge stylus construction and may be of any desired shape. Such styli are shown, for example, in U.S. Pat. No. 3,871,664. Preferably, the styli are formed of jewel material such as diamond or saphire.

Each of the styli 12 and 14 comprises a cylindrical body portion terminating in a tip at one end. The tips are suitably shaped and ground so as to define a record engaging edge defined by a plane parallel to the stylus longitudinal axis. Thus, stylus 12 is formed with edge 18 and stylus 14 is formed with edge 20.

As stated above, the styli 12 and 14 of assembly 10 are as shown in U.S. Pat. No. 3,871,664. Accordingly, as discussed in that patent, the styli are designed to normally engage a record groove along opposite edges which together define a plane passing through each stylus tip. This configuration may be seen most clearly in FIG. 2 of U.S. Pat. No. 3,871,664.

Figure 2:
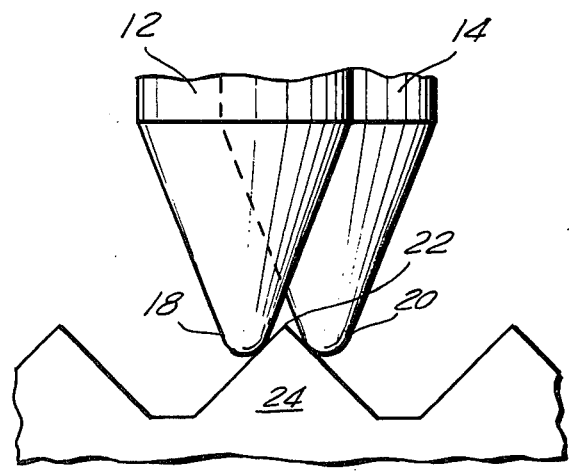
FIG. 2 is a front elevational view showing the stylus assembly and an associated stamper; and, FIG. 3 is an exaggerated bottom plan view of the stylus assembly and stamper.
Figure 3:
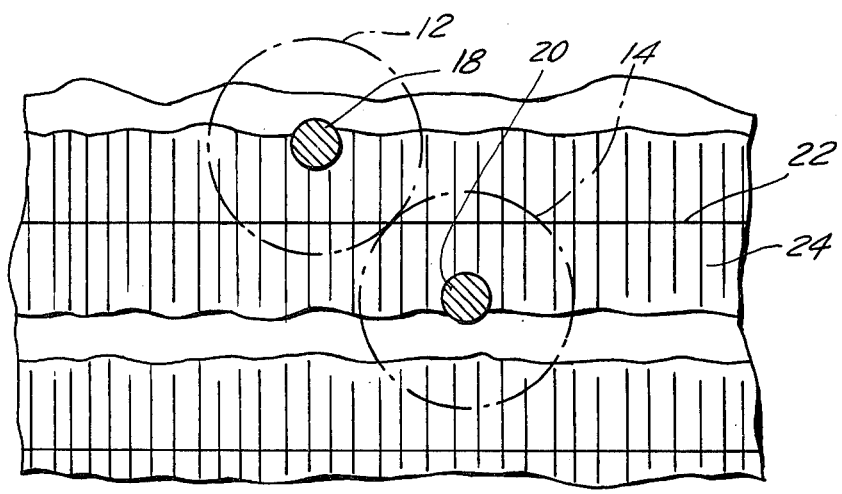

As shown in present FIG. 2, the styli 12 and 14 are bonded to one another so that the tips of the styli are aligned and the planes defining the record engaging edges 18 and 20 are parallel to each other. Referring back to FIG. 1, it can be seen that the bonded styli are then, in turn, bonded to tube 16 at the ends opposite the tips. It should be noted that stylus 12 is positioned in front of stylus 14. That is, the plane defining edge 20 is offset from the plane defining edge 18. In addition, the longitudinal axes of the styli are shifted with respect to one another. Stated another way as shown in FIG. 3, the longitudinal axes of styli 12 and 14 and hence the planes containing edges 18 and 20 are parallel but the styli are offset from each other in both directions perpendicular to the longitudinal axis that is, along tube 16 as well as transverse to tube 16. This arrangement defines a generally inverted "V" shaped gap generally designated by reference numeral 22 between the tips. This gap enables the styli of the assembly to stride the ridge of a stamper and engage the ridge 24 from opposite sides.

The stylus assembly is designed to track a record stamper to translate undulations in the ridges of the stamper into movement of the tube 16. Tube 16, in turn, carries a magnetic member (not shown) which cooperates with a cartridge assembly (not shown) to generate electrical signals corresponding to the stamper construction. A conventional phonograph turntable could be used to play back the stamper although it would be necessary for the stamper to rotate in the direction opposite to the direction necessary to play a phonograph record.

Although the styli 12 and 14 engage the stamper ridge slightly out of phase with each other due to the offset in the direction of the ridge, the offset is immaterial and not noticeable during playback. Since the styli are formed of relatively hard jewels, as it engaged the stamper it would tend to have a light polishing action thereby removing any burrs or extraneous material on the stamper. This polishing action is minimized by the fact that the styli are offset from each other. Thus, in accordance with the above, the aforementioned objects are attained.

Having thus described the invention, what is claimed is:

1. A stylus assembly for tracking a phonograph record stamper or matrix having raised ridges having information comprising:

a first stylus member having a longitudinally extending body portion terminating at one end in a pointed tip and having a record engaging edge;

a second stylus member having a longitudinally extending body portion terminating at one end in a pointed tip and having a record engaging edge;

an elongated tube; the ends of said first and second styli members opposite said tips being bonded to said tube, said tips defining a line angled to said tube axis at an angle other than zero; and, said first and second styli members being bonded to one another generally in the form of an inverted "V" and oriented so that said tips are aligned to engage the ridges from opposite sides offset from one another in the direction along the direction of tube elongation.

2. The invention in accordance with claim 1 wherein said first and second styli are identical with each other.

3. The invention in accordance with claim 2 wherein said styli are formed of jewels.

* * * * *